(12) United States Patent
Choi et al.

(10) Patent No.: US 7,969,710 B2
(45) Date of Patent: Jun. 28, 2011

(54) SOLID ELECTROLYTIC CAPACITOR AND METHOD OF MANUFACTURING THE SAME

(75) Inventors: Hee Sung Choi, Gyeonggi-do (KR); Seoung Jae Lee, Gyeonggi-do (KR); Yeoung Jin Lee, Gyeonggi-do (KR); Sung Han Won, Seoul (KR); Ha Yong Jung, Gyeonggi-do (KR); Hyun Ho Shin, Gyeonggi-do (KR); Jung Tae Park, Seoul (KR); Jae Youn Jeong, Gyeonggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 254 days.

(21) Appl. No.: 12/007,195

(22) Filed: Jan. 8, 2008

(65) Prior Publication Data

US 2009/0154068 A1    Jun. 18, 2009

(30) Foreign Application Priority Data

Dec. 17, 2007    (KR) .......................... 10-2007-0132563

(51) Int. Cl.
*H01G 4/228* (2006.01)
*H01G 9/04* (2006.01)
*H01G 9/10* (2006.01)
*H05K 5/03* (2006.01)

(52) U.S. Cl. .................... 361/533; 361/538; 361/540

(58) Field of Classification Search .................. 361/533, 361/532, 538, 540, 528
See application file for complete search history.

(56) References Cited

U.S. PATENT DOCUMENTS
4,093,972 A * 6/1978 Voyles .......................... 361/540
4,571,664 A * 2/1986 Hyland .......................... 361/540
(Continued)

FOREIGN PATENT DOCUMENTS
JP    02-256222    10/1990
(Continued)

OTHER PUBLICATIONS

Korean Office Action issued in Korean Patent Application No. KR 10-2007-0132563, dated Aug. 27, 2009.
(Continued)

*Primary Examiner* — Eric Thomas
*Assistant Examiner* — David M Sinclair
(74) *Attorney, Agent, or Firm* — McDermott Will & Emery LLP

(57) ABSTRACT

Provided is a solid electrolytic capacitor including a capacitor element with a positive polarity; an anode wire of which one side is inserted into the capacitor element and the other side projects outward from the capacitor element; a cathode extraction layer formed on the capacitor element; a plurality of conductive bumps formed on the cathode extraction layer; an anode lead frame fixed to the side of the capacitor element, where the anode wire projects outward, and having an insertion portion into which the projecting end of the anode wire is inserted; a molding portion formed to surround the capacitor element and exposing the projecting end of the anode wire, the outer surface of the anode lead frame, and ends of the conductive bumps; an anode lead terminal provided on the molding portion so as to be electrically connected to the exposed end of the anode wire and the anode lead frame; and a cathode lead terminal provided on the molding portion so as to be electrically connected to the exposed ends of the conductive bumps.

7 Claims, 6 Drawing Sheets

U.S. PATENT DOCUMENTS

| | | | |
|---|---|---|---|
| 5,349,496 A * | 9/1994 | Taniguchi et al. | 361/528 |
| 5,781,401 A * | 7/1998 | Tomiyasu et al. | 361/303 |
| 6,284,555 B1 * | 9/2001 | Kormendy et al. | 438/15 |
| 6,411,499 B2 * | 6/2002 | Kormendy et al. | 361/539 |
| 6,616,713 B2 * | 9/2003 | Sano et al. | 29/25.03 |
| 6,819,546 B2 * | 11/2004 | Kuriyama | 361/535 |
| 7,085,127 B2 * | 8/2006 | Goldberger et al. | 361/523 |
| 7,633,740 B2 * | 12/2009 | Choi et al. | 361/540 |
| 7,724,502 B2 * | 5/2010 | Petržilek et al. | 361/523 |
| 2005/0062151 A1 * | 3/2005 | Nagao | 257/734 |

FOREIGN PATENT DOCUMENTS

| | | | |
|---|---|---|---|
| JP | 06-224085 | | 8/1994 |
| JP | 06-333788 | | 12/1994 |
| JP | 11-026309 | | 1/1999 |
| JP | 2001274539 A | * | 10/2001 |
| JP | 2002-025860 | | 1/2002 |
| JP | 2000-049048 | | 2/2002 |
| KR | 10-2002-0026673 | | 4/2002 |

OTHER PUBLICATIONS

United States Office Action issued in U.S. Appl. No. 12/689,866 dated Oct. 15, 2010.

* cited by examiner

[FIG. 1] PRIOR ART
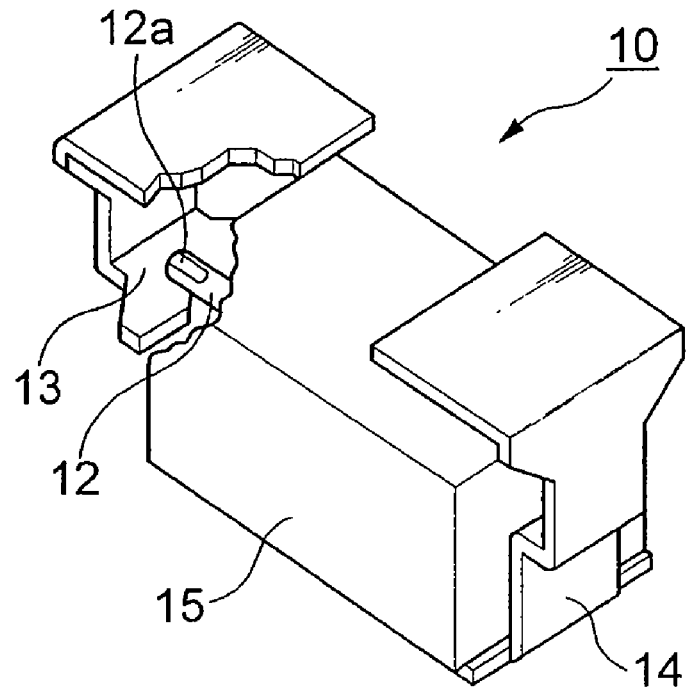
[FIG. 2] PRIOR ART
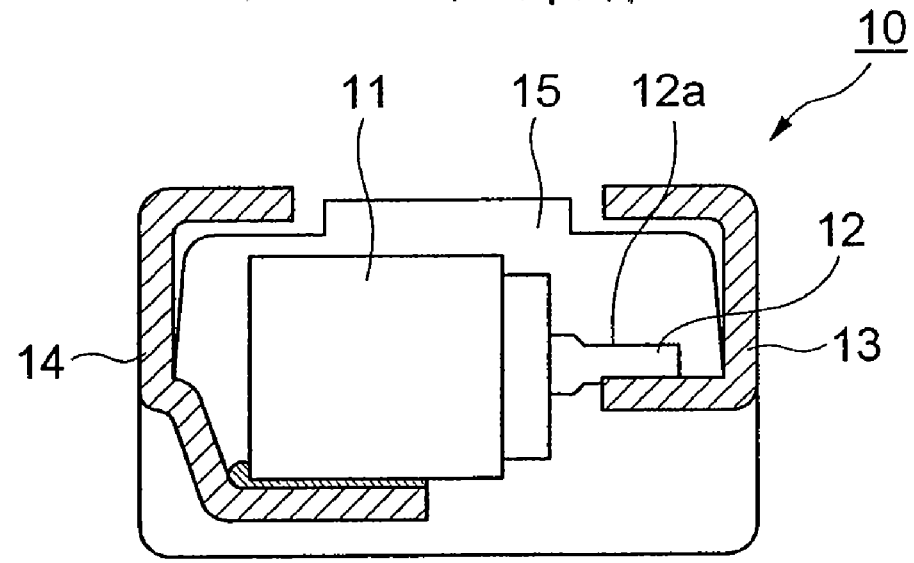

[FIG. 3]
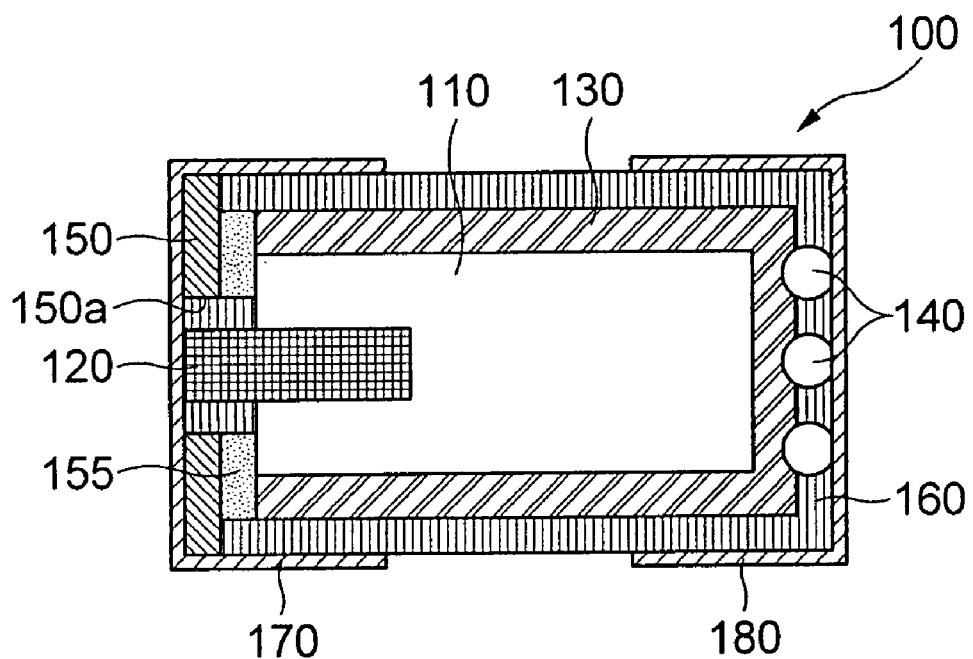
[FIG. 4]
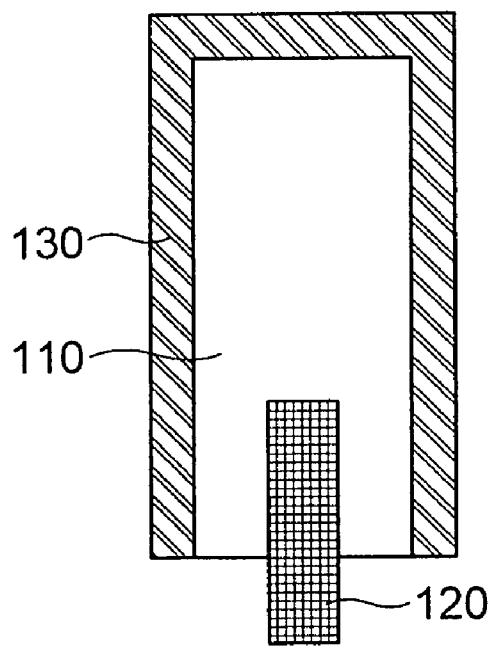

[FIG. 5]
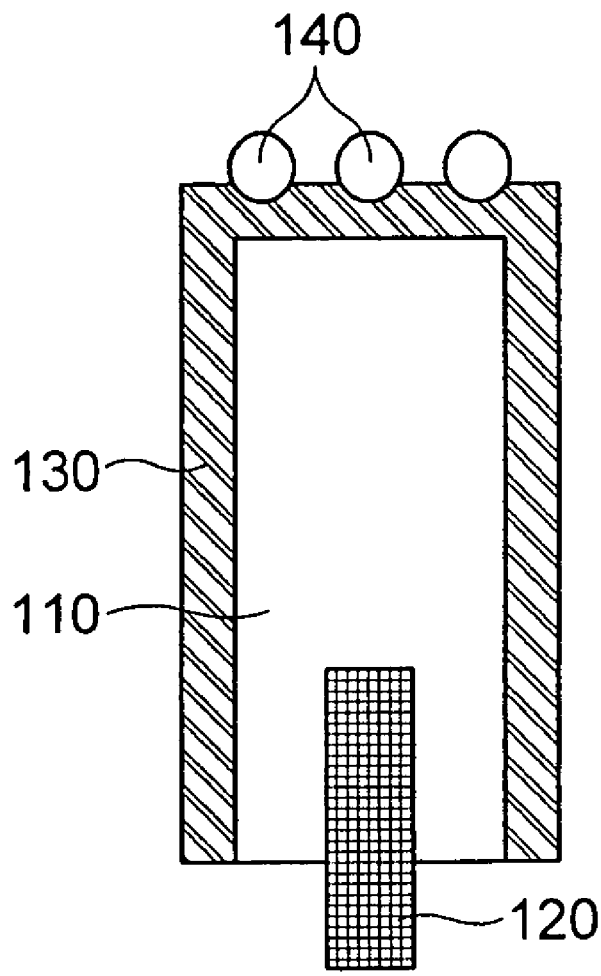
[FIG. 6]
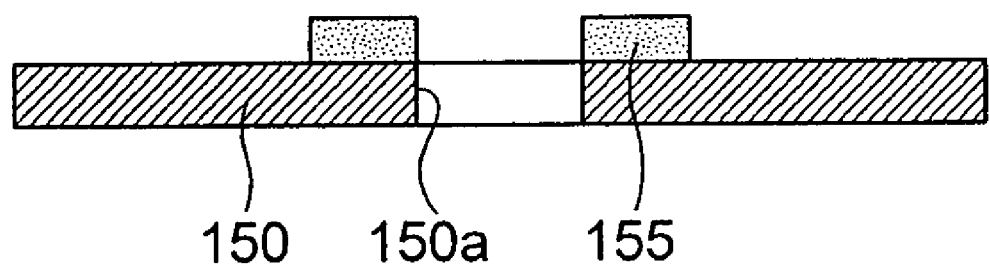

[FIG. 7]
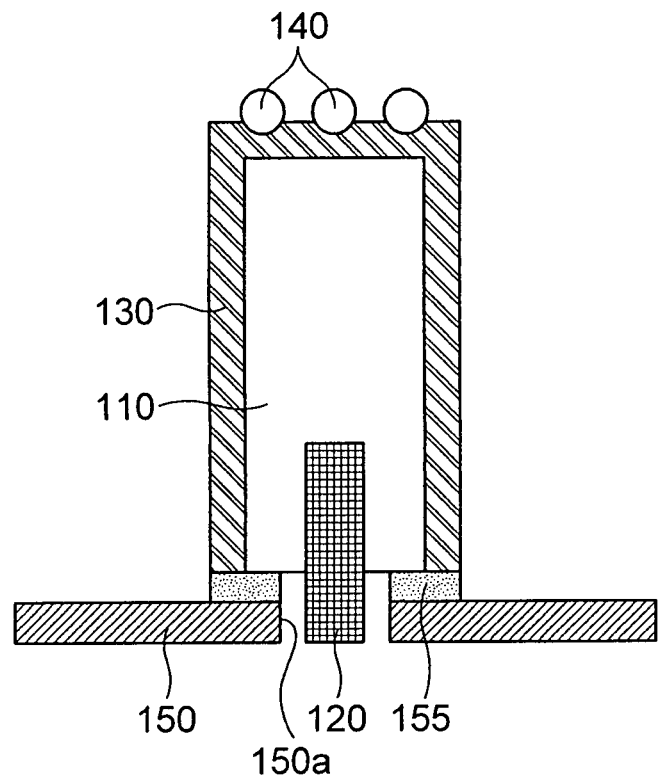
[FIG. 8]
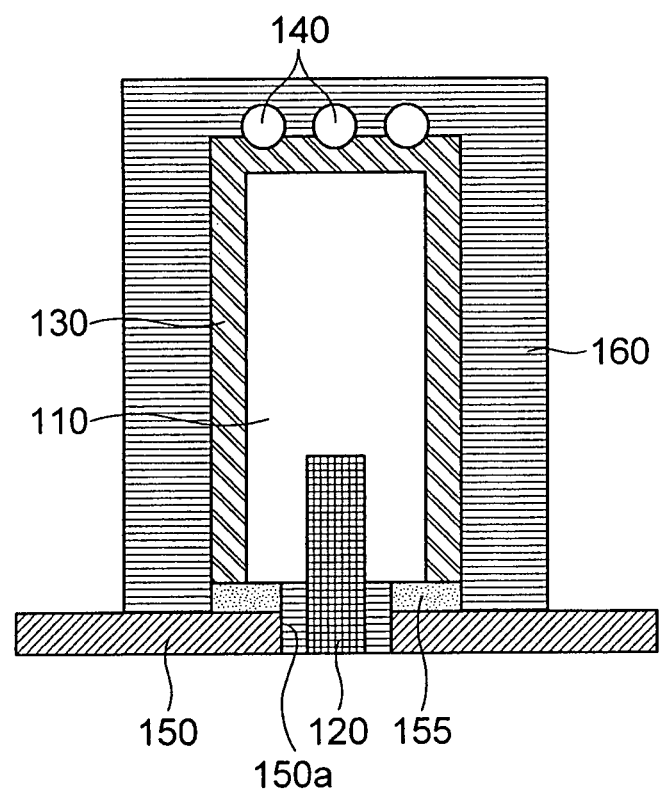

[FIG. 9]
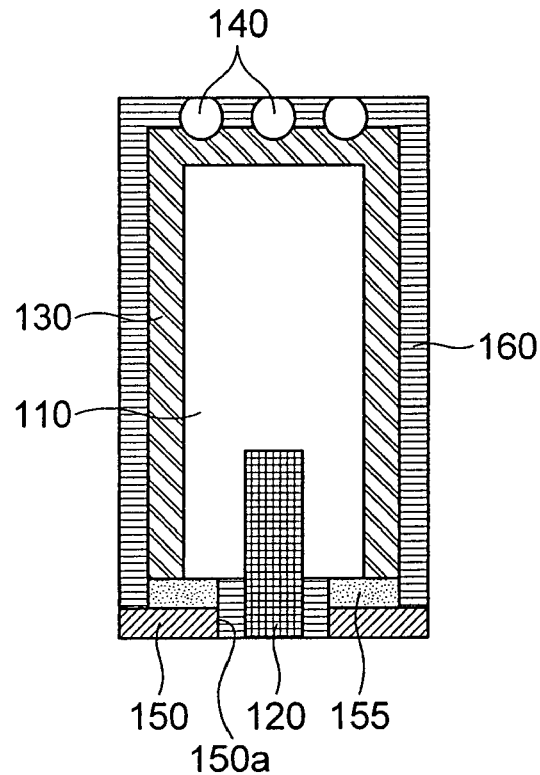
[FIG. 10]
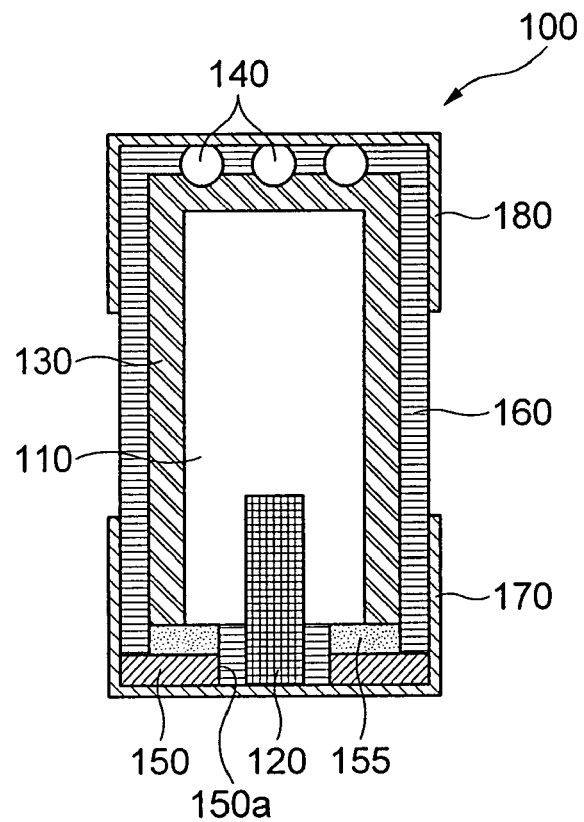

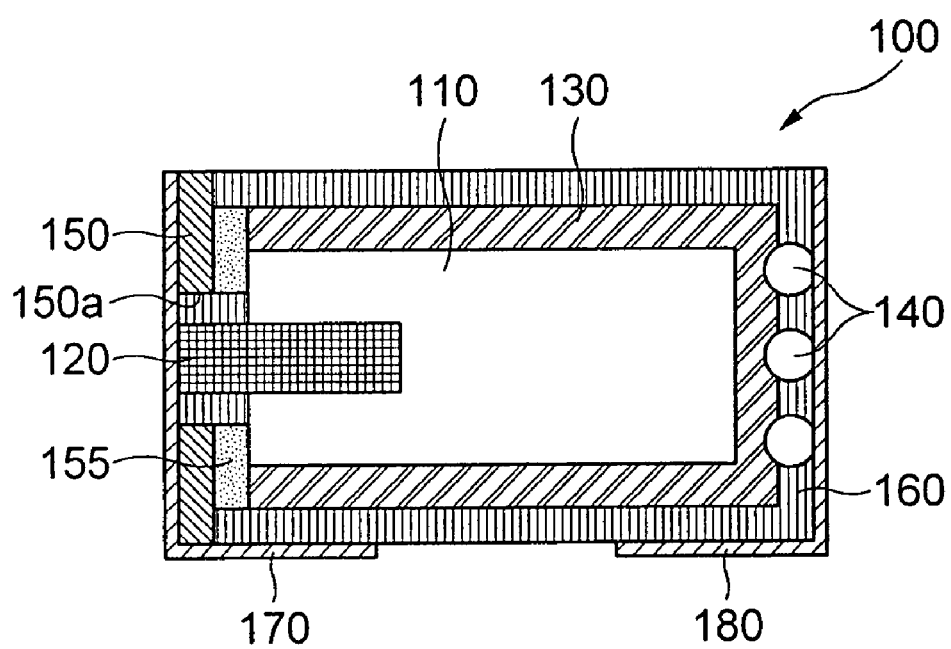
[FIG. 11]

SOLID ELECTROLYTIC CAPACITOR AND METHOD OF MANUFACTURING THE SAME

CROSS-REFERENCE TO RELATED APPLICATIONS

This application claims the benefit of Korean Patent Application No. 10-2007-0132563 filed with the Korea Intellectual Property Office on Dec. 17, 2007, the disclosure of which is incorporated herein by reference.

BACKGROUND OF THE INVENTION

1. Field of the Invention

The present invention relates to a solid electrolytic capacitor and a method of manufacturing the same.

2. Description of the Related Art

In general, solid electrolytic capacitors having a function of storing electricity are electronic components used for blocking direct currents and passing alternating currents. Among the solid electrolytic capacitors, the most representative one is a tantalum capacitor which is used in application circuits, of which the rate voltage range is low, as well as general industrial equipments. In particular, the tantalum capacitor is frequently used in circuits requiring an excellent frequency characteristic or for reducing noise of communication equipments.

FIG. 1 is a perspective view of a conventional solid electrolytic capacitor, and FIG. 2 is a cross-sectional view of the conventional solid electrolytic capacitor. As shown in FIGS. 1 and 2, the solid electrolytic capacitor 10 includes a capacitor element 11 which determines the capacity and characteristic of the capacitor and is formed of dielectric ceramic powder, anode and cathode lead frames 13 and 14 which are connected to the capacitor element 11 so as to be easily mounted on a printed circuit board (PCB), and an epoxy case 15 which is molded of epoxy so as to protect the capacitor element 11 from the external environment and to form the shape of the capacitor element.

In one side of the capacitor element 11, a rod-shaped anode wire 12 is formed to project with a predetermined length.

The anode wire 12 has a planar surface 12a provided thereon, the pressed surface 12a increasing a contact area with the anode lead frame 13 and preventing the anode lead frame 12 from rocking from side to side during welding.

The capacitor element 11 is manufactured by the following process. First, dielectric ceramic powder is molded in a rectangular parallelepiped shape in a pressing process and is then sintered. Further, a dielectric oxide film is formed on the surface of the sintered body. Then, the body is dipped into a manganese nitrate solution such that a manganese dioxide layer composed of a solid electrolyte is formed on the outer surface of the body.

A process of connecting the anode and cathode lead frames 13 and 14 to the capacitor element 11 manufactured in such a manner includes two steps. In the first step, the plate-shaped anode lead frame 13 is welded on the planar surface 12a of the rod-shaped anode wire 12, which projects from one side surface of the capacitor element 11 at a predetermined length, so as to derive an anode terminal. In the second step, a cathode terminal is derived through the surface of the capacitor element 11 or a conductive adhesive coated on the cathode lead frame 14.

Then, the capacitor element 11 is electrically connected to the anode and cathode lead frames 13 and 14, respectively, and the epoxy case 15 is molded of epoxy. Then, the solid electrolytic capacitor is completed through a subsequent assembling process.

The above-described conventional electrolytic capacitor has the following problems.

While the anode wire 12 and the anode lead frame 13 are directly welded, high-temperature heat is generated. The generated heat has an effect upon the capacitor element 11 through the anode wire 12, thereby damaging the capacitor element 11 which is vulnerable to heat.

Further, dielectrics are destroyed by the heat shock applied to the capacitor element 11 such that a product quality is degraded and defects occur. Therefore, a manufacturing cost increases.

Further, the anode lead frame 13 and the cathode lead frame 14 occupy such a large space in the epoxy case 15. Therefore, the capacitor element 11 is inevitably reduced in size within the epoxy case 15. As a result, the capacitance of the capacitor decreases.

SUMMARY OF THE INVENTION

An advantage of the present invention is that it provides a solid electrolytic capacitor and a method of manufacturing the same, which can reduce a manufacturing cost by simplifying a structure and a manufacturing process, can achieve a reduction in size, can maximize capacitance, and can implement a low ESR (Equivalent Series Resistance) characteristic.

Additional aspects and advantages of the present general inventive concept will be set forth in part in the description which follows and, in part, will be obvious from the description, or may be learned by practice of the general inventive concept.

According to an aspect of the invention, a solid electrolytic capacitor comprises a capacitor element with a positive polarity; an anode wire of which one side is inserted into the capacitor element and the other side projects outward from the capacitor element; a cathode extraction layer formed on the capacitor element; a plurality of conductive bumps formed on the cathode extraction layer; an anode lead frame fixed to the side of the capacitor element, where the anode wire projects outward, and having an insertion portion into which the projecting end of the anode wire is inserted; a molding portion formed to surround the capacitor element and exposing the projecting end of the anode wire, the outer surface of the anode lead frame, and ends of the conductive bumps; an anode lead terminal provided on the molding portion so as to be electrically connected to the exposed end of the anode wire and the anode lead frame; and a cathode lead terminal provided on the molding portion so as to be electrically connected to the exposed ends of the conductive bumps.

Preferably, the anode lead frame is bonded to the side of the capacitor element through an insulating adhesive and is formed of a conductive material.

The cathode extraction layer may be composed of a dielectric oxide coating film, a solid-state electrolyte layer, and a cathode reinforcing layer, which are sequentially formed on the capacitor element.

The conductive bumps may be formed of metal selected from silver (Ag), copper (Cu), zinc (Zn), and tin (Sn), and may be provided in the form of dots dispensed on the surface of the cathode extraction layer.

Alternately, the conductive bumps may be formed of ink or paste including metal selected from Ag, Cu, Zn, and Sn, and may be provided on the surface of the cathode extraction layer through an inkjet method.

The anode lead terminal and the cathode lead terminal may be formed of a plated layer obtained by an electroless plating method.

Preferably, the plated layer is composed of an inner plated layer obtained through electroless Ni/P plating and an outer plated layer obtained by plating the inner plated layer with Cu or Sn.

According to another aspect of the invention, a method of manufacturing a solid electrolytic capacitor comprises the steps of: (a) forming a capacitor element with a positive polarity; (b) inserting and connecting an anode wire to one side of the capacitor element; (c) forming a cathode extraction layer on the capacitor element; (d) forming a plurality of bumps on the cathode extraction layer; (e) inserting a projecting end of the anode wire into an insertion portion of the anode lead frame, and fixing the capacitor element to the anode lead frame; (f) forming a molding portion to surround the capacitor element; (g) exposing the projecting end of the anode wire, the outer surface of the anode lead frame, and ends of the conductive bumps; and (h) forming an anode lead terminal, which is electrically connected to the exposed end of the anode wire and the outer surface of the anode lead frame, and a cathode lead terminal which is electrically connected to the exposed ends of the conductive bumps.

The method may further comprise the step of cutting the projecting end of the anode wire such that the projecting end of the anode wire is adjacent to the surface of the capacitor element. The cutting of the projecting end is performed after step (b).

The method may further comprise the step of coating the surface of the anode wire with an insulating material. The coating of the surface is performed before the cutting of the projecting end.

Preferably, the projecting end of the anode wire is cut by ultraviolet (UV) laser.

Step (d) may be performed after step (e).

In step (e), an insulating adhesive may be provided on the anode lead frame, the projecting end of the anode wire may be inserted into the insertion portion of the anode lead frame, and the capacitor element may be pressed against the anode lead frame so as to be fixed to the anode lead frame.

When the capacitor element is pressed against the anode lead frame, the position of the capacitor element is accurately adjusted in a state where the insulating adhesive is semi-cured by applying heat to the anode lead frame, and then the insulating adhesive is completely cured.

In step (f), the molding portion may be formed so as to seal the projecting end of the anode wire, the anode lead frame, and the conductive bumps.

In step (g), the molding portion may be diced in such a manner that the projecting end of the anode wire, the outer surface of the anode lead frame, and the ends of the conductive bumps are exposed.

Preferably, the diced portion is subjected to grinding, polishing, or sand blasting.

In step (h), the anode lead terminal may be constructed by forming a plated layer on the exposed end of the anode wire, the outer surface of the anode lead frame, and the molding portion adjacent to the anode lead frame through an electroless plating method, and the cathode lead terminal may be constructed by forming a plated layer on the exposed ends of the conductive bumps and the molding portion adjacent to the conductive bumps through the electroless plating method.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a perspective view of a conventional solid electrolytic capacitor;

FIG. 2 is a cross-sectional view of the conventional solid electrolytic capacitor;

FIG. 3 is a front cross-sectional view of a solid electrolytic capacitor according to the invention;

FIGS. 4 to 10 are cross-sectional views sequentially showing a method of manufacturing a solid electrolytic capacitor according to the invention;

FIG. 11 is a cross-sectional view of a solid electrolytic capacitor according to a modification of the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a solid electrolytic capacitor and a method of manufacturing the same according to the present invention will be described in detail with reference to the accompanying drawings.

Referring to FIG. 3, a solid electrolytic capacitor according to the invention will be described in detail.

FIG. 3 is a front cross-sectional view of a solid electrolytic capacitor according to the invention.

As shown in FIG. 3, the solid electrolytic capacitor 100 according to the invention includes a capacitor element 110 with a positive polarity, an anode wire of which one side is inserted into the capacitor element 110 and the other side projects outward from the capacitor element 110, a cathode extraction layer 130 formed on the capacitor element 110, a plurality of conductive bumps formed on the cathode extraction layer 130, an anode lead frame 150 which is fixed to the side of the capacitor element 110 where the anode wire 120 projects outward and has an insertion portion 150a into which the projecting end of the anode wire 120 is inserted, a molding portion 160 which is formed to surround the capacitor element 110 and exposes the projecting end of the anode wire 120, the outer surface of the anode lead frame 150, and ends of the conductive bumps 140, an anode lead terminal 170 which is provided on the molding portion 160 so as to be electrically connected to the exposed end of the anode wire 120 and the anode lead frame 150, and a cathode lead terminal 180 which is provided on the molding portion 160 so as to be electrically connected to the exposed ends of the conductive bumps 140.

The cathode extraction layer 130 is composed of a dielectric oxide coating film, a solid-state electrolyte layer, and a cathode reinforcing layer, which are sequentially formed on the capacitor element 110, and has a negative polarity.

In this case, it is preferable that the cathode extraction layer 130 is formed on the surface of the capacitor element 110 excluding the surface where the anode wire 120 is formed, in order to prevent the anode wire 120 and the cathode extraction layer 130 from being electrically connected to each other.

Alternately, the projecting surface of the anode wire 120 may be coated with an insulating material so as to be insulated from the cathode extraction layer 130.

The conductive bumps 140, which serve as a medium for electrically connecting the cathode lead terminal 180 and the cathode extraction layer 130, are formed of metal selected from silver (Ag), copper (Cu), zinc (Zn), and tin (Sn). The conductive bumps 140 may be provided in the form of dots dispensed on the surface of the cathode extraction layer 130 opposed to the anode wire 120.

The conductive bumps 140 may be formed of ink or paste including metal selected from Ag, Cu, Zn, and Sn and may be provided on the surface of the cathode extraction layer 130 opposed to the anode wire 120 through an inkjet method.

Preferably, the anode lead frame 150 is bonded to the side of the capacitor element 110, where the anode wire 120 projects outward, through an insulating adhesive 155.

That is, since the anode lead terminal 170 which is electrically connected to the anode wire 120 is formed on the outer surface of the anode lead frame 150, the anode lead frame 150 is bonded and coupled to the capacitor element 110 through the insulating adhesive 155 such that the cathode extraction layer 130 and the anode lead terminal 170 are insulated from each other.

The anode lead frame 150 has the insertion portion 150a into which the projecting end of the anode wire 120 is inserted. The insertion portion 150a may be provided in the form of a hole or groove which is opened in a direction perpendicular to the direction where the anode wire 120 projects.

The anode lead terminal 170 and the cathode lead terminal 180 may be formed of a plated layer obtained by an electroless plating method.

Preferably, the plated layer is composed of an inner plated layer obtained through electroless Ni/P plating and an outer plated layer obtained by plating the inner plated layer with Cu or Sn.

Hereinafter, a method of manufacturing a solid electrolytic capacitor according to the invention will be described in detail with reference to FIGS. 4 to 10.

FIGS. 4 to 10 are cross-sectional views sequentially showing a method of manufacturing a solid electrolytic capacitor according to the invention. FIG. 4 is a cross-sectional view of a capacitor element having an anode wire and a cathode extraction layer formed therein. FIG. 5 is a cross-sectional view of the capacitor element, showing a state where a plurality of conductive bumps are formed. FIG. 6 is a cross-sectional view showing a state where an insulating adhesive is provided on the anode lead frame. FIG. 7 is a cross-sectional view showing a state where the capacitor element of FIG. 5 is bonded to the anode lead frame of FIG. 6. FIG. 8 is a cross-sectional view showing a state where a molding portion is formed. FIG. 9 is a cross-sectional view showing a state where the molding portion is diced. FIG. 10 is a cross-sectional view showing a state where an anode lead terminal and a cathode lead terminal are formed.

The method of manufacturing a solid electrolytic capacitor according to the invention includes the steps of: forming a capacitor element 110 with a positive polarity; inserting and connecting an anode wire 120 to one side of the capacitor element 110; forming a cathode extraction layer 130 on the capacitor element 110; forming a plurality of conductive bumps on the cathode extraction layer 130; inserting a projecting end of the anode wire 120 into an insertion portion 150a of an anode lead frame 150 and fixing the capacitor element 110 to the anode lead frame 150; forming a molding portion 160 to surround the capacitor element 110; exposing the projecting end of the anode wire 120, an outer surface of the anode lead frame 150, and ends of the conductive bumps 140; and forming an anode lead terminal 170, which is electrically connected to the exposed end of the anode wire 120 and the outer surface of the anode lead frame 150, and a cathode lead terminal which is electrically connected to the exposed ends of the conductive bumps 140.

More specifically, as shown in FIG. 4, the anode wire 120 is inserted and connected to one side of the capacitor element 110 with a positive polarity, and the cathode extraction layer 130 is formed on the capacitor element 110.

The cathode extraction layer 130 is composed of a dielectric oxide coating film, a solid-state electrolyte layer, and a cathode reinforcing layer, which are sequentially formed on the capacitor element 110, and has a negative polarity.

In this case, it is preferable that the cathode extraction layer 130 is formed on the surface of the capacitor element 110 excluding the surface where the anode wire 120 is formed, in order to prevent the anode wire 120 and the cathode extraction layer 130 from being electrically connected to each other.

Alternately, the projecting surface of the anode wire 120 may be coated with an insulating material so as to be insulated from the cathode extraction layer 130.

Meanwhile, after the anode wire 120 is inserted into and connected to the capacitor element 110, the projecting end of the anode wire 120 can be cut so as to be adjacent to the surface of the capacitor element 110, in order for the miniaturization of the solid electrolytic capacitor or an increase in capacitance.

The projecting end of the anode wire 120 may be cut by ultraviolet (UV) laser.

At this time, before the projecting end of the anode wire 120 is cut, it is preferable that the surface of the anode wire 120 is coated with an insulating material.

The coating is performed to prevent LC defects which may occur in the cutting of the anode wire 120.

Next, as shown in FIG. 5, the conductive bumps 140 are formed on the surface of the cathode extraction layer 130, which is opposed to the anode wire 120.

The conductive bumps 140 are formed of metal selected from Ag, Cu, Zn, and Sn. The conductive bumps 140 may be provided in the form of dots dispensed on the surface of the cathode extraction layer 130.

Alternately, the conductive bumps 140 may be formed of ink or paste including metal selected from Ag, Cu, Zn, and Sn and may be provided on the surface of the cathode extraction layer 130 through an inkjet method.

Preferably, the conductive bumps 140 are formed to have a diameter of 10 to 500 μm. More preferably, the conductive bumps 140 are formed to have a diameter of 50 to 200 μm.

Next, as shown in FIG. 6, an insulating adhesive 155 is formed on the anode lead frame 150.

Then, as shown in FIG. 7, the capacitor element 110 of FIG. 5 is bonded to the anode lead frame 150 through the insulating adhesive 155.

That is, the projecting end of the anode wire 120 is inserted into the insertion portion 150a of the anode lead frame 150, and the capacitor element 110 is pressed against the anode lead frame 105 so as to be bonded and coupled to the anode lead frame 105.

At this time, the pressing force for bonding the capacitor element 110 to the anode lead frame 150 is applied in such a manner that the insulating adhesive 155 has a thickness of 10 to 70 μm.

Further, if necessary, while heat is applied to the insulating adhesive 155, the insulating adhesive 155 is semi-cured to accurately adjust the position of the capacitor element 110. Then, the semi-cured adhesive 155 is completely cured in a sealed oven or through a reflow curing process such that the capacitor element 110 can be fixed to the anode lead frame 150.

At this time, it is preferable that the insulating adhesive 155 is cured at a temperature of 150 to 170° C. for 40 to 60 minutes.

Meanwhile, the forming of the conductive bumps 140 on the cathode extraction layer 130 may be performed after the capacitor element 110 is fixed to the anode lead frame 150.

Then, as shown in FIG. 8, the molding portion 160 is formed to seal the projecting end of the anode wire 120, the anode lead frame 150, and the conductive bumps 140.

The molding portion 160 may be formed of epoxy-based resin.

Preferably, the molding portion 160 is cured at a temperature of about 170° C. If necessary, a post curing process may be added, in which the molding portion 160 is cured at a temperature of 160° C. for 30 to 60 minutes.

Next, as shown in FIG. 9, the molding portion 160 is diced in such a manner that the projecting end of the anode wire 120 and the ends of the conductive bumps 140 are exposed.

At this time, it is preferable that the diced portion of the molding portion 160 is subjected to grinding, polishing, and sand blasting.

Finally, as shown in FIG. 10, the anode lead terminal 170 and the cathode lead terminal 180 are formed.

The anode lead terminal 170 may be constructed by forming a plated layer on the exposed end of the anode wire 120, the outer surface of the anode lead frame 150, and the molding portion 160 adjacent to the anode lead frame 150 by an electroless plating method.

Preferably, the plated layer is composed of an inner plated layer obtained through electroless Ni/P plating and an outer plated layer obtained by plating the inner plated layer with Cu or Sn.

Preferably, the inner plated layer is formed to have a thickness of 0.1 to 20 μm. More preferably, the inner plated layer is formed to have a thickness of 0.3 to 3 μm.

Preferably, the outer plated layer is formed to have a thickness of 0.1 to 10 μm.

Further, the cathode lead terminal 180 may be also constructed by forming a plated layer on the exposed ends of the conductive bumps 140 and the surface of the molding portion 160 adjacent to the conductive bumps 140 through an electroless plating method.

Similar to the anode lead terminal 170, the plated layer may be composed of an inner plated layer and an outer plated layer.

FIG. 11 is a cross-sectional view of a solid electrolytic capacitor according to a modification of the invention. As shown in FIG. 11, the anode lead terminal 170 and the cathode lead terminal 180 are not formed in a U shape, but may be formed in an L shape.

According to the present invention, the structure of the solid electrolytic capacitor and the manufacturing process thereof can be simplified to reduce a manufacturing cost. Further, the solid electrolytic capacitor can be reduced in size, and the capacitance can be maximized. Furthermore, a low ESR characteristic can be implemented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A solid electrolytic capacitor comprising:
   a capacitor element with a positive polarity;
   an anode wire of which one side is inserted into the capacitor element and the other side projects outward from the capacitor element;
   a cathode extraction layer formed on the capacitor element;
   a plurality of conductive bumps formed on the cathode extraction layer;
   an anode lead frame fixed to the side of the capacitor element, where the anode wire projects outward, and having an insertion portion into which the projecting end of the anode wire is inserted;
   an insulating adhesive interposed between the anode lead frame and the side of the capacitor element to fix the anode lead frame to the side of the capacitor element;
   a molding portion formed to surround the capacitor element and exposing the projecting end side of the anode wire, the outer surface of the anode lead frame, and ends of the conductive bumps;
   an anode lead terminal provided on the molding portion so as to be electrically connected to the exposed end side of the anode wire and the anode lead frame; and
   a cathode lead terminal provided on the molding portion so as to be electrically connected to the exposed ends of the conductive bumps,
   wherein the molding portion is further formed in the insertion portion and surrounds the projecting end of the anode wire.

2. The solid electrolytic capacitor according to claim 1, wherein the anode lead frame is formed of a conductive material.

3. The solid electrolytic capacitor according to claim 1, wherein the cathode extraction layer is composed of a dielectric oxide coating film, a solid-state electrolyte layer, and a cathode reinforcing layer, which are sequentially formed on the capacitor element.

4. The solid electrolytic capacitor according to claim 1, wherein the conductive bumps are formed of metal selected from silver (Ag), copper (Cu), zinc (Zn), and tin (Sn), and are provided in the form of dots dispensed on the surface of the cathode extraction layer.

5. The solid electrolytic capacitor according to claim 1, wherein the conductive bumps are formed of ink or paste including metal selected from Ag, Cu, Zn, and Sn, and are provided on the surface of the cathode extraction layer through an inkjet method.

6. The solid electrolytic capacitor according to claim 1, wherein the anode lead terminal and the cathode lead terminal are formed of a plated layer obtained by an electroless plating method.

7. The solid electrolytic capacitor according to claim 6, wherein the plated layer is composed of an inner plated layer obtained through electroless Ni/P plating and an outer plated layer obtained by plating the inner plated layer with Cu or Sn.

* * * * *